(12) United States Patent
Moriyama et al.

(10) Patent No.: US 10,234,640 B2
(45) Date of Patent: Mar. 19, 2019

(54) OPTICAL CONNECTOR AND CONNECTOR

(71) Applicant: FUJITSU COMPONENT LIMITED, Tokyo (JP)

(72) Inventors: Satoshi Moriyama, Tokyo (JP); Osamu Daikuhara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/637,273

(22) Filed: Jun. 29, 2017

(65) Prior Publication Data

US 2018/0031781 A1 Feb. 1, 2018

(30) Foreign Application Priority Data

Jul. 28, 2016 (JP) .................................. 2016-148689

(51) Int. Cl.
*G02B 6/38* (2006.01)
*G02B 6/42* (2006.01)

(52) U.S. Cl.
CPC ......... *G02B 6/3871* (2013.01); *G02B 6/3822* (2013.01); *G02B 6/3843* (2013.01); *G02B 6/3887* (2013.01); *G02B 6/4246* (2013.01); *G02B 6/4292* (2013.01); *G02B 6/3885* (2013.01); *G02B 6/3893* (2013.01)

(58) Field of Classification Search
None
See application file for complete search history.

(56) References Cited

U.S. PATENT DOCUMENTS

| 2002/0031313 A1* | 3/2002 | Williams ............. G02B 6/3825 385/92 |
| 2015/0309269 A1 | 10/2015 | Daikuhara et al. |
| 2016/0223763 A1* | 8/2016 | Benner ................ G02B 6/3829 |

FOREIGN PATENT DOCUMENTS

JP 2015-023143 2/2015

* cited by examiner

*Primary Examiner* — Jerry Rahll
(74) *Attorney, Agent, or Firm* — IPUSA, PLLC

(57) ABSTRACT

An optical connector includes a first connector and a second connector configured to be mated to the first connector. The first connector includes a plate having an opening, a substrate stacked on the plate, and an adapter having an opening and connected to the plate. The second connector includes a housing and a ferrule configured to connect to an optical fiber. The ferrule is provided in the housing to project from the housing to have an end of the ferrule exposed outside the housing. The ferrule is inserted in the openings when the first connector and the second connector are mated together.

9 Claims, 21 Drawing Sheets

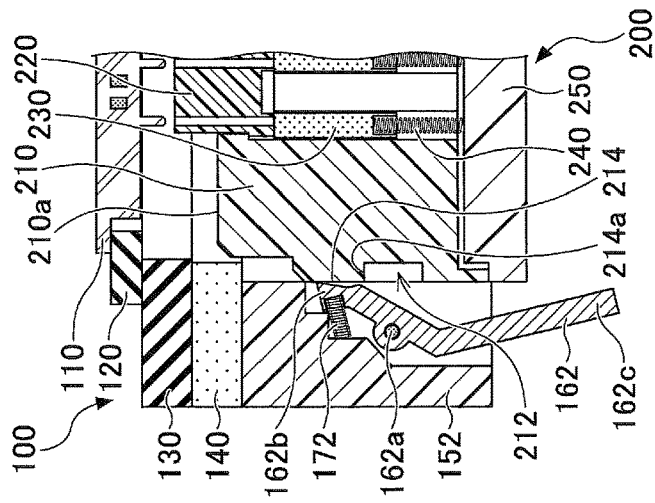
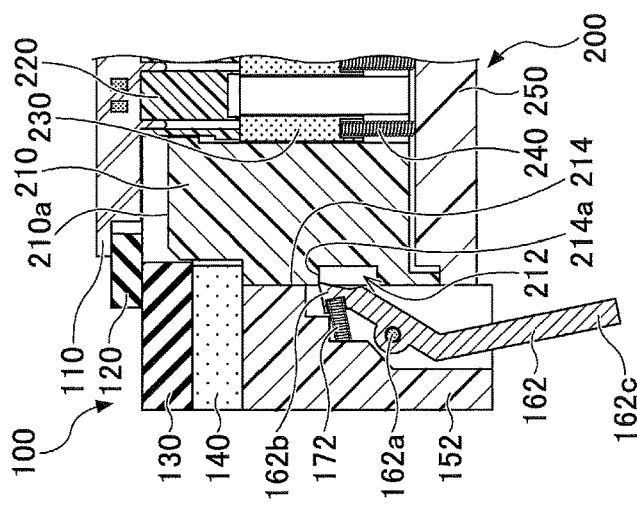
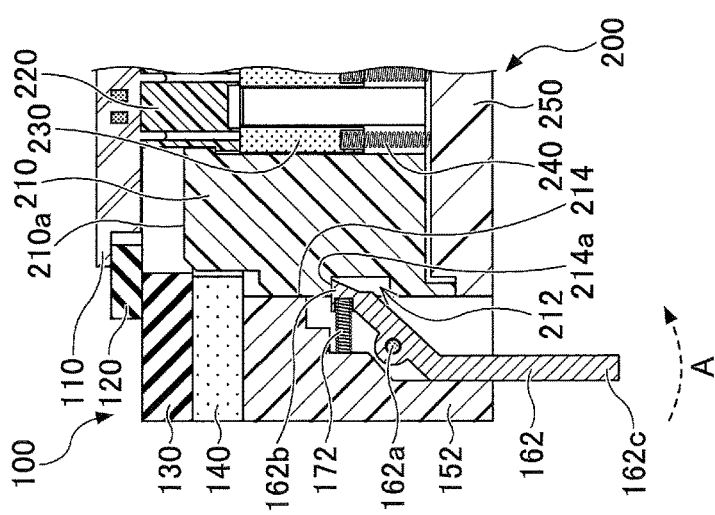

OPTICAL CONNECTOR AND CONNECTOR

CROSS-REFERENCE TO RELATED APPLICATION

The present application is based upon and claims priority to Japanese Patent Application No. 2016-148689, filed on Jul. 28, 2016, the entire contents of which are incorporated herein by reference.

BACKGROUND OF THE INVENTION

1. Field of the Invention

The present invention relates to optical connectors and connectors.

2. Description of the Related Art

In communications at high-speed interfaces of supercomputers and high-end servers, optical communications that can extend a transmission distance are becoming popular in response to increasing signal transmission rates.

Next-generation interfaces whose transmission distance is as long as several dozen meters employ an optical module for converting an electrical signal and an optical signal. The optical module is used when connecting an optical fiber and a server or the like. The optical module converts an optical signal from the optical fiber into an electrical signal, and outputs the electrical signal to the server. Furthermore, the optical module converts an electrical signal from the server into an optical signal, and outputs the optical signal to the optical fiber.

Reference may be made to Japanese Laid-open Patent Publication No. 2015-23143 for related art.

SUMMARY OF THE INVENTION

According to an aspect of the present invention, an optical connector includes a first connector and a second connector configured to be mated to the first connector. The first connector includes a plate having an opening, a substrate stacked on the plate, and an adapter having an opening and connected to the plate. The second connector includes a housing and a ferrule configured to connect to an optical fiber. The ferrule is provided in the housing to project from the housing to have an end of the ferrule exposed outside the housing. The ferrule is inserted in the openings when the first connector and the second connector are mated together.

According to an aspect of the present invention, a connector configured to connect to another connector including an optical fiber includes a housing and an optical module. The housing includes a first housing and a second housing that are combined to form an opening into which the other connector is to be inserted. The optical module is disposed over the opening. The optical module includes a plate disposed over the opening and a substrate stacked on the plate.

According to an aspect of the present invention, a connector configured to connect to another connector includes a housing, a ferrule, and a cover. The ferrule is provided in the housing, and is configured to connect to an optical fiber. The cover is configured to cover the optical fiber when the ferrule connects to the optical fiber. The cover includes a first cover and a second cover that are combined with each other. At least one of the first cover and the second cover includes a curved surface having a radius of curvature greater than the minimum bend radius of the optical fiber.

BRIEF DESCRIPTION OF THE DRAWINGS

FIGS. 9A through 9C are schematic diagrams illustrating a method of disconnecting the optical connector plug from the optical connector jack according to the first embodiment;

DESCRIPTION OF THE EMBODIMENTS

Figure 1:
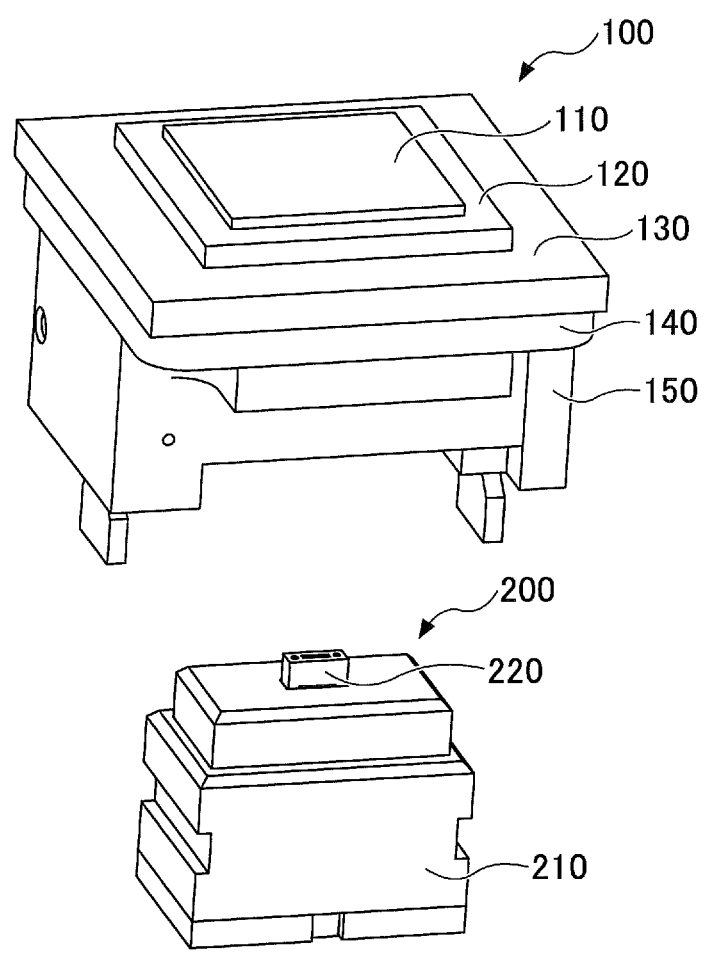
FIG. 1 is a perspective view of an optical connector according to a first embodiment.

It is desired to reduce the size of an optical connector that connects light-emitting and light-receiving devices and optical fibers.

According to an aspect of the present invention, a smaller optical connector is provided.

Embodiments of the present invention are described below. The same elements or members are referred to using the same reference numeral, and are not repetitively described.

First Embodiment

[Structure of Optical Connector]

Figure 2:
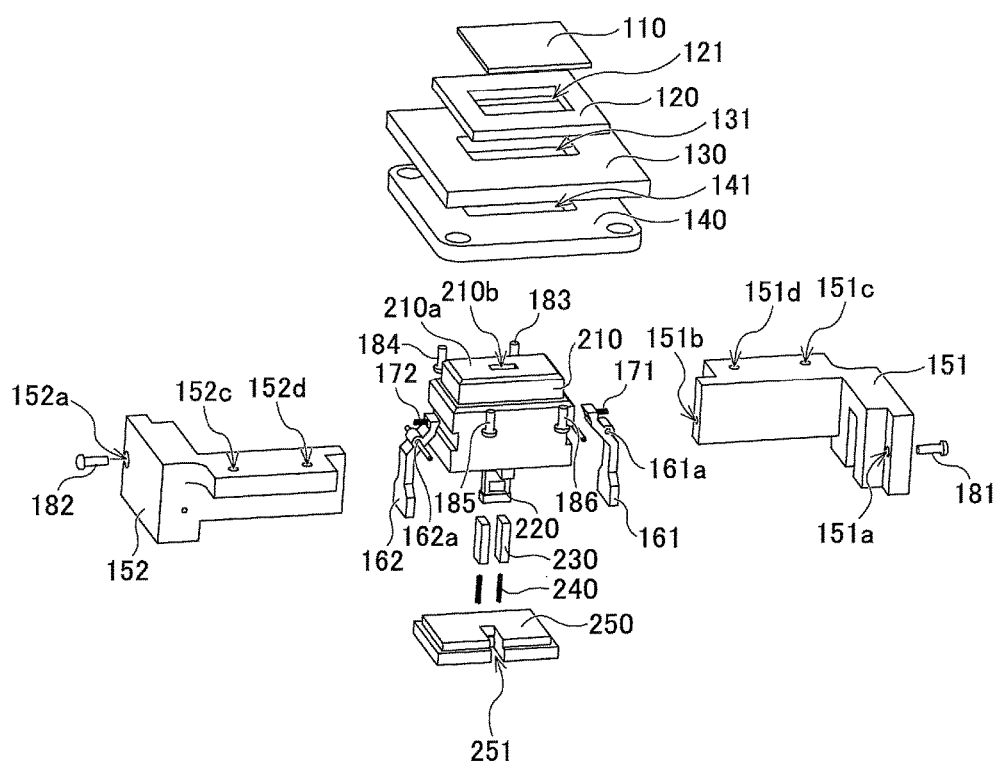
FIG. 2 is an exploded perspective view of the optical connector according to the first embodiment.
Figure 3A:
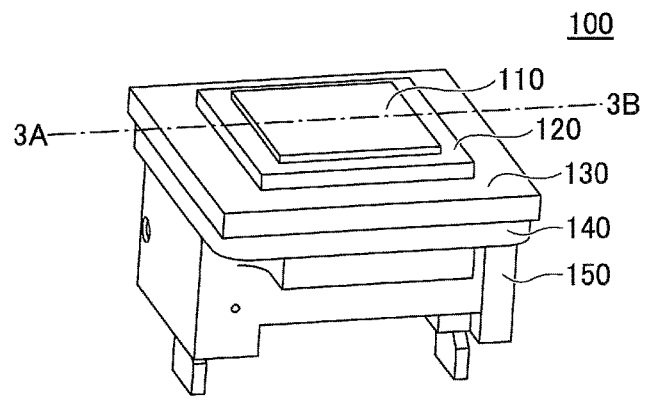
FIGS. 3A and 3B are diagrams depicting a structure of an optical connector jack according to the first embodiment.
Figure 3B:
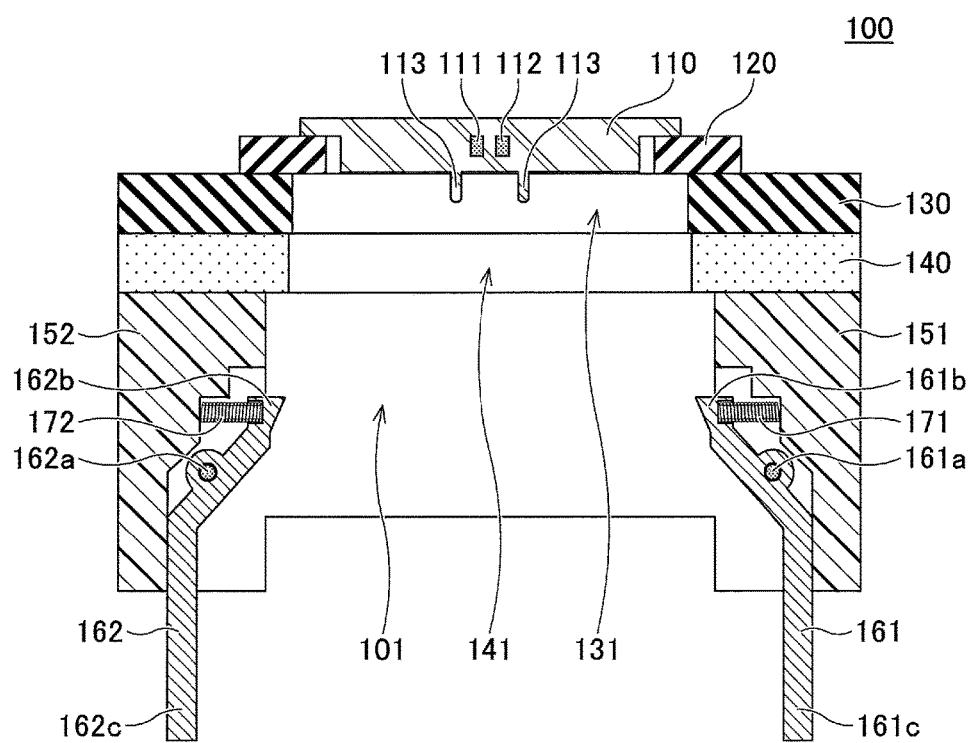

An optical connector according to a first embodiment is described. FIG. 1 is a perspective view of an optical connector according to the first embodiment. FIG. 2 is an exploded perspective view of an optical connector jack (hereinafter "jack") 100 and an optical connector plug (hereinafter "plug") 200 of the optical connector. FIG. 3A is a perspective view of the jack 100 in the assembled state. FIG. 3B is a schematic cross-sectional view of the jack 100 in the assembled state, taken along the one-dot chain line 3A-3B of FIG. 3A.

Referring to FIG. 1, the optical connector according to this embodiment includes the jack 100 and the plug 200 that can be mated to each other. In the following, the jack may be referred to as "first optical connector" and the plug may be referred to as "second optical connector."

Referring to FIGS. 1 through 3B, the jack 100 includes a plate 140, and a wiring substrate ("substrate") 130, a land grid array (LGA) socket 120 and an optical module 110 that are successively stacked in this order on the plate 140.

A light-emitting device 111 such as a vertical-cavity surface-emitting laser (VCSEL) and a light-receiving device 112 such as a photodiode (PD), which are photoelectric conversion devices, are mounted in the optical module 110. The light-emitting device 111 emits light based on an electrical signal for driving the light-emitting device 111 that is output from an IC. The light-receiving device 112 converts input light into an electric signal, and inputs the electric signal to a transimpedance amplifier (TIA) via the substrate 130. The light-emitting device 111 and the light-receiving device 112 are provided in the optical module 110, which is partially formed of a material that transmits light so as not to affect entry or emission of light. The optical module 110 is fixed to the substrate 130 through the LGA socket 120. The optical module 110 is fixed to the LGA socket 120 and the substrate 130 with a member that generates enough contact force to provide electric contact between the elements, and that also can withstand such contact force. Although not illustrated, a member that presses the LGA socket 120 toward the optical module 110 from above is used. A heat radiating component may be provided on the optical module 110 to radiate heat.

An opening 141 for receiving the plug 200 is formed in the plate 140. An opening 131 for receiving a below-described ferrule 220 of the plug 200 is formed in the substrate 130. An opening 121 for connecting the ferrule 220 and the optical module 110 is formed in the LGA socket 120.

An adapter 150 including a first adapter 151 and a second adapter 152 is attached to the bottom of the plate 140. A first ejection member 161 is attached to the first adapter 151, and a second ejection member 162 is attached to the second adapter 152. According to this embodiment, each of the first adapter 151 and the second adapter 152 has an L-letter shape, and are joined to form the adapter 150. As a result, an opening 101 for receiving the plug 200 is formed in the adapter 150.

According to this embodiment, the optical module 110 including the light-emitting device 111 and the light-receiving device 112 is provided on one side of the substrate 130, and the opening 101 is formed on the other side of the substrate 130.

The first adapter 151 and the second adapter 152 are joined to each other by screws 181 and 182. Screw holes 151a and 151b are formed in the first adapter 151, and a screw hole 152a and a screw hole corresponding to the screw hole 151a (not illustrated) are formed in the second adapter 152. Furthermore, screw holes 151c and 151d for connecting the first adapter 151 to the plate 140 by screws 183 and 184 are formed in the first adapter 151. Screw holes 152c and 152d for connecting the second adapter 152 to the plate 140 by screws 185 and 186 are formed in the second adapter 152.

The first ejection member 161 is attached to the first adapter 151 on its opening 101 side to be pivotable about a shaft 161a. The first ejection member 161 includes a lock 161b positioned closer to the bottom of the opening 101 than is the shaft 161a, and an operation part 161c projecting outward from the opening 101. A coil spring 171 is provided between the first adapter 151 and the lock 161b. The second ejection member 162 is attached to the second adapter 152 on its opening 101 side to be pivotable about a shaft 162a. The second ejection member 162 includes a lock 162b positioned closer to the bottom of the opening 101 than is the shaft 162a, and an operation part 162c projecting outward from the opening 101. A coil spring 172 is provided between the second adapter 152 and the lock 162b. The coil springs 171 and 172 urge the locks 161b and 162b toward each other.

Figure 4A:
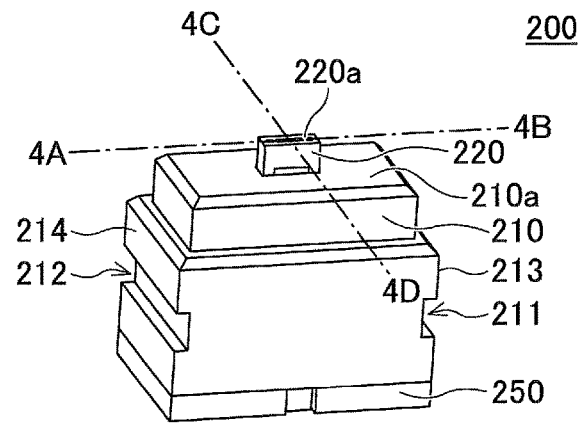
FIGS. 4A and 4B are diagrams depicting a structure of an optical connector plug according to the first embodiment.
Figure 4B:
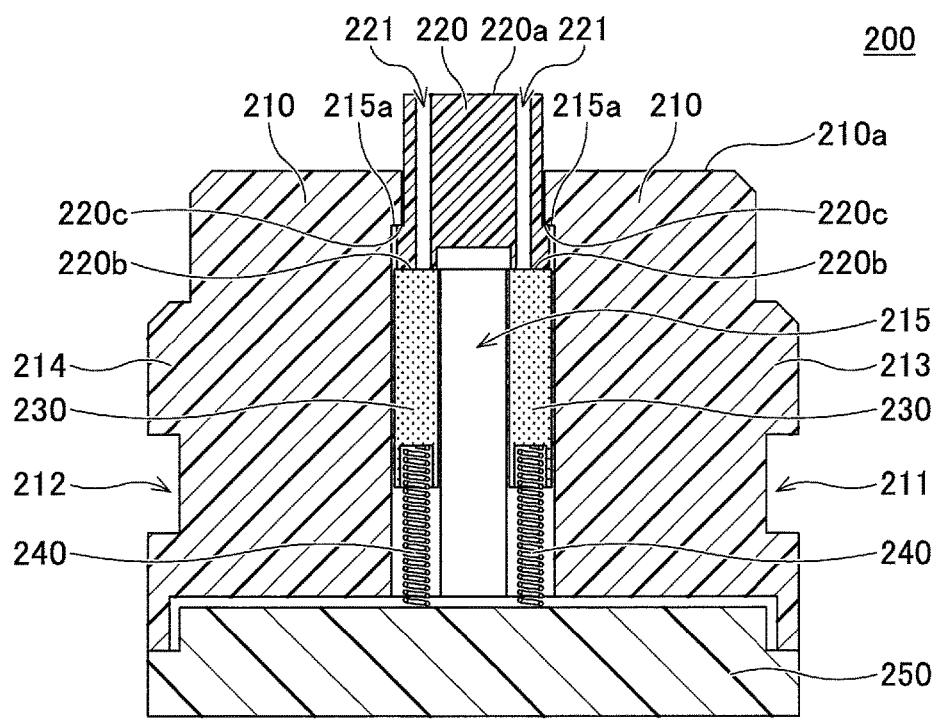

FIG. 4A is a perspective view of the plug 200 in the assembled state. FIG. 4B is a cross-sectional view of the plug 200, taken along the one-dot chain line 4A-4B of FIG. 4A. Referring to FIGS. 4A and 4B as well as FIG. 2, the plug 200 includes a housing 210, the ferrule 220, two pistons 230, two coil springs 240, and a lid 250. The ferrule 220, the pistons 230, and the coil springs 240 are accommodated in an opening 215 of the housing 210. The opening 215 is closed by the lid 250. In the state depicted in FIGS. 4A and 4B, the ferrule 220 is projecting from a top end 210a of the housing 210 through an opening 210b provided in the top end 210a as depicted in FIG. 2 to have a first end 220a of the ferrule 220 exposed outside the housing 210. The top end 210a is positioned deepest in the opening 101 when the plug 200 is inserted into the jack 100. An optical fiber 260 (FIG. 5) is connected to the ferrule 220 through a recess 251 formed in the lid 250.

Referring to FIGS. 4A and 4B, the ferrule 220 has a second end 220b pressed on both sides by the coil springs 240 provided between the pistons 230 and the lid 250. Because of the urging forces of the coil springs 240, a stepped part 220c of the ferrule 220 contacts a contact part 215a provided in the opening 215, and an end portion of the ferrule 220 projects from the top end 210a to be exposed outside the housing 210. Through holes 221 for alignment are formed in the ferrule 220.

A recess 211 corresponding to the lock 161b of the first ejection member 161 and a recess 212 corresponding to the lock 162b of the second ejection member 162 are formed one on each side of the housing 210 in its side surface. A projection 213 and a projection 214 are formed on the side surface of the housing 210 between the top end 210a and the recess 211 and between the top end 210a and the recess 212, respectively.

Figure 5:
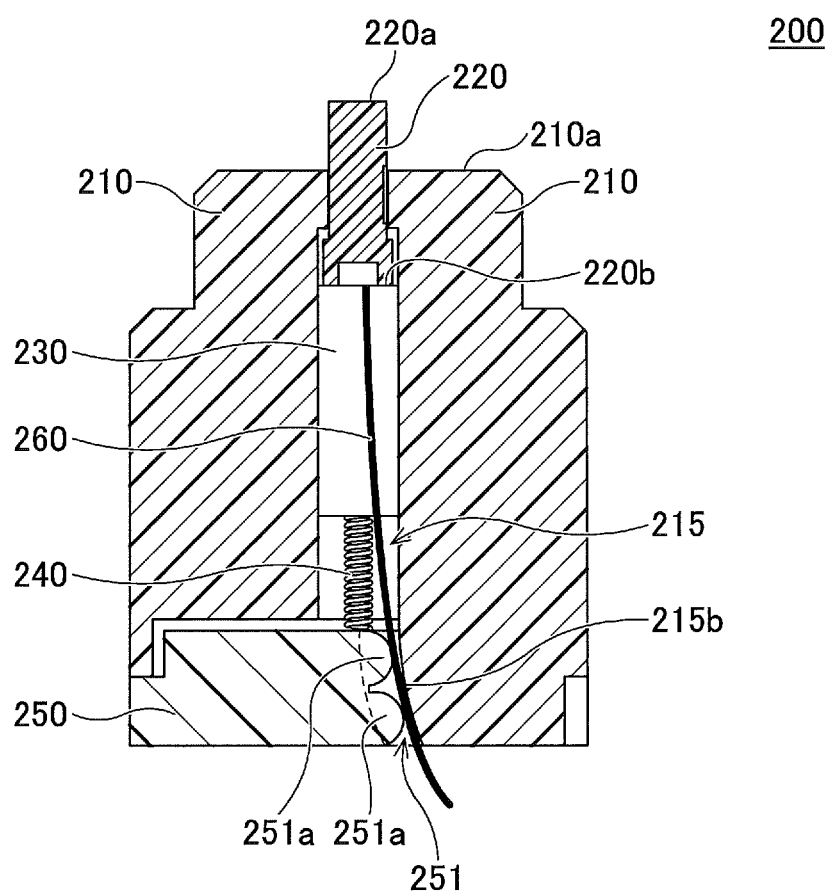
FIG. 5 is a cross-sectional view of the optical connector plug according to the first embodiment.

FIG. 5 is a cross-sectional view of the plug 200, taken along the one-dot chain line 4C-4D of FIG. 4A. Referring to FIG. 5, the optical fiber 260 is connected to the second end 220b of the ferrule 220, and the recess 251 through which the optical fiber 260 passes is formed in the lid 250. A portion of the recess 251 that contacts the optical fiber 260 includes protrusions 251a having a substantially circular cross-sectional shape. The housing 210 includes a curved surface 215b in the opening 215. The optical fiber 260 is held between the surface 215b and the protrusions 251a to be fixed. The surface 215b is formed with a radius of curvature greater than or equal to the minimum bend radius of the optical fiber 260.

Figure 6A:
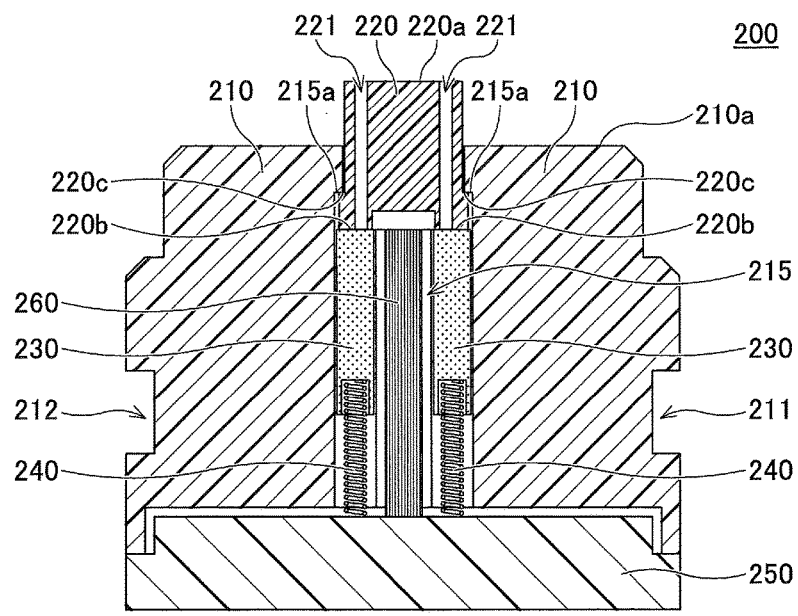
FIGS. 6A and 6B are diagrams for illustrating the optical connector plug according to the first embodiment.
Figure 6B:
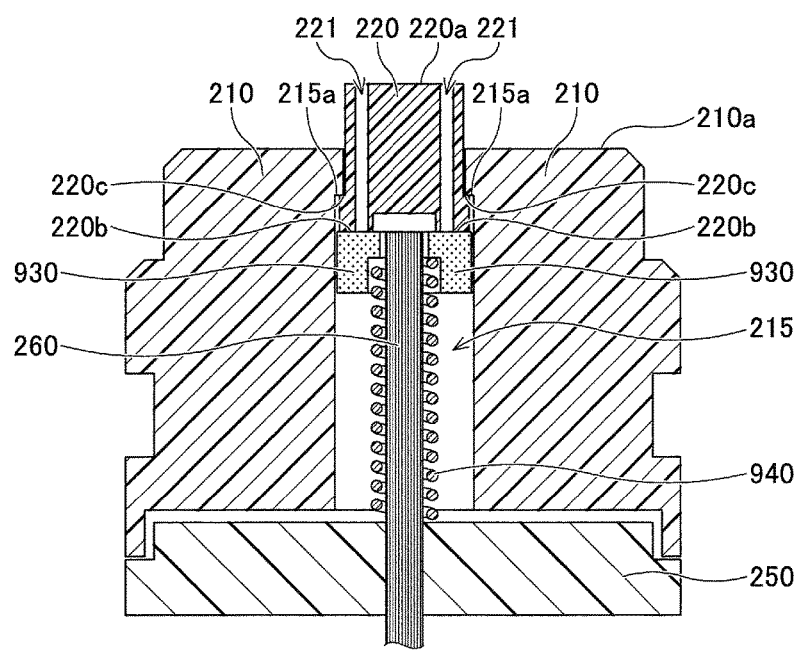

Referring to FIG. 6A, the ferrule 220 has its second end 220b held on both sides by the two pistons 230 urged by the coil springs 240. In contrast, FIG. 6B depicts a plug in which a piston 930 is urged upward by a single coil spring 940. Referring to FIG. 6B, the optical fiber 260 is inserted through the coil spring 940. According to this embodiment, the plug 200 can be smaller in size than in the case of holding the ferrule 220 by the piston 930 using the single coil spring 940 as depicted in FIG. 6B. That is, according to the plug of FIG. 6B, because the optical fiber 260 is inserted through the coil spring 940, the coil spring 940 becomes relatively large in diameter, so that the plug may be thicker in the direction going into the plane of the paper to be larger in size. In contrast, according to this embodiment, the optical fiber 260 is disposed between the two coil springs 240. Therefore, when the plug 200 is assembled, the optical fiber 260 need not be inserted through either coil spring 240. Furthermore, the diameter of the coil springs 240 can be reduced. Therefore, the thickness of the plug 200 in the direction going into the plane of the paper can be reduced, and accordingly, the size of the plug 200 is reduced.

Figure 7A:
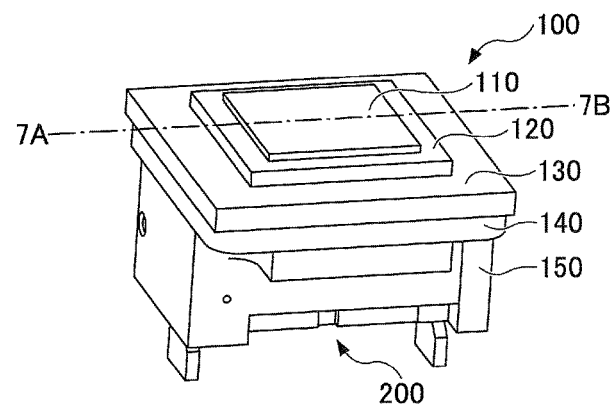
FIGS. 7A and 7B are diagrams depicting a structure of the optical connector plug and the optical connector jack that are mated together according to the first embodiment.
Figure 7B:
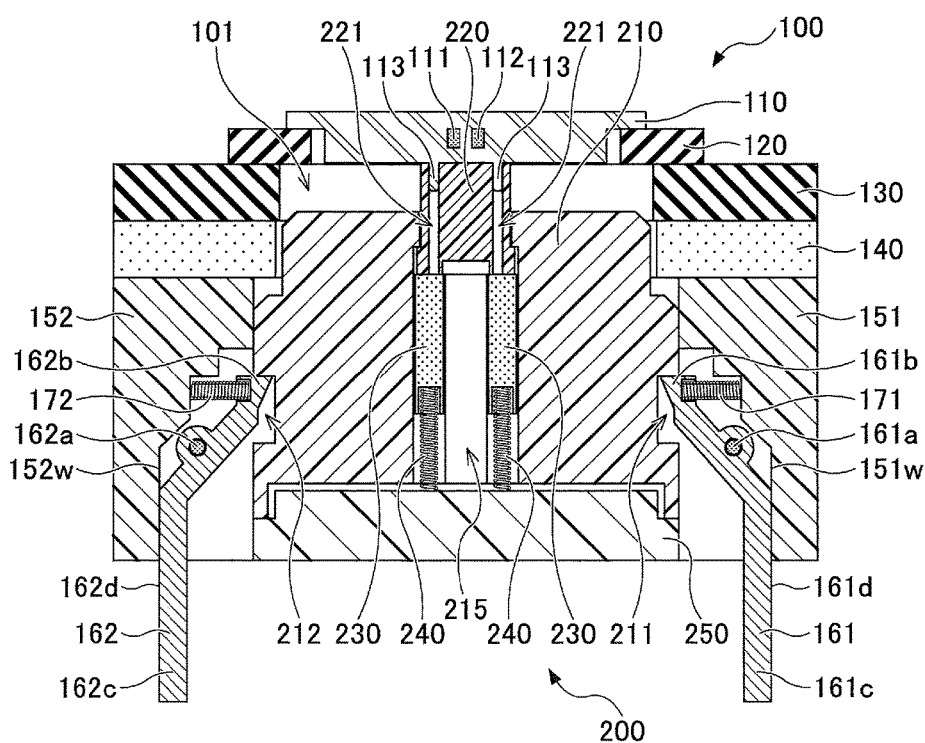

FIG. 7A is a perspective view of the optical connector according to this embodiment, in which the jack 100 and the plug 200 are mated to each other. FIG. 7B is a schematic cross-sectional view of the optical connector, taken along the one-dot chain line 7A-7B of FIG. 7A.

According to this embodiment, the ferrule 220 is placed into the opening 101, so that the jack 100 and the plug 200 are mated and connected to each other. At this point, protrusions 113 at a surface of the optical module 110 enter the through holes 221 of the ferrule 220 to align the ferrule 220 and the optical module 110. As a result, the light-emitting device 111 and the light-receiving device 112 are aligned.

When the jack 100 and the plug 200 are connected, the lock 161b of the first ejection member 161 is in the recess 211 formed in the side surface of the plug 200, and the lock 162b of the second ejection member 162 is in the recess 212. The locks 161b and 162b enter the recesses 211 and 212, respectively, to prevent the jack 100 and the plug 200 mated together from disengaging from each other.

When the plug 200 is not in the opening 101 or when the jack 100 and the plug 200 are mated together, an arm 161d of the first ejection member 161 contacts a surface 151w of the first adapter 151 on its opening 101 side to prevent the lock 161b from moving into the opening 101 beyond a predetermined position. Likewise, an arm 162d of the second ejection member 162 contacts a surface 152w of the second adapter 152 on its opening 101 side to prevent the lock 162b from moving into the opening 101 beyond a predetermined position.

[Connecting and Disconnecting Method]

Figure 8A:
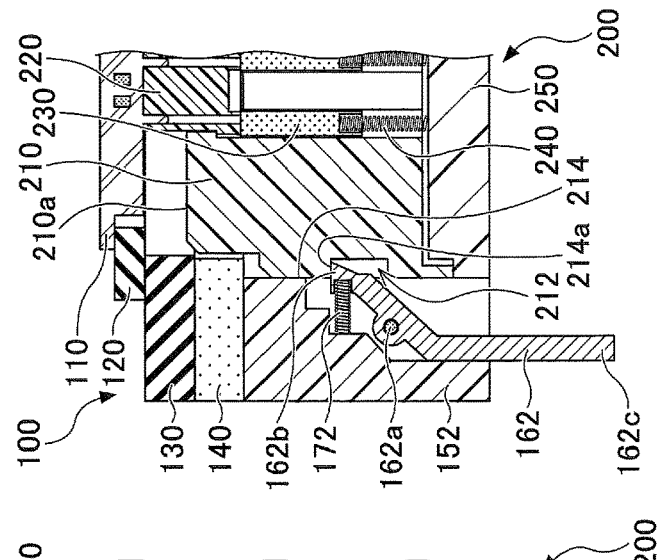
FIGS. 8A through 8C are schematic diagrams illustrating a method of connecting the optical connector plug and the optical connector jack according to the first embodiment.
Figure 8B:
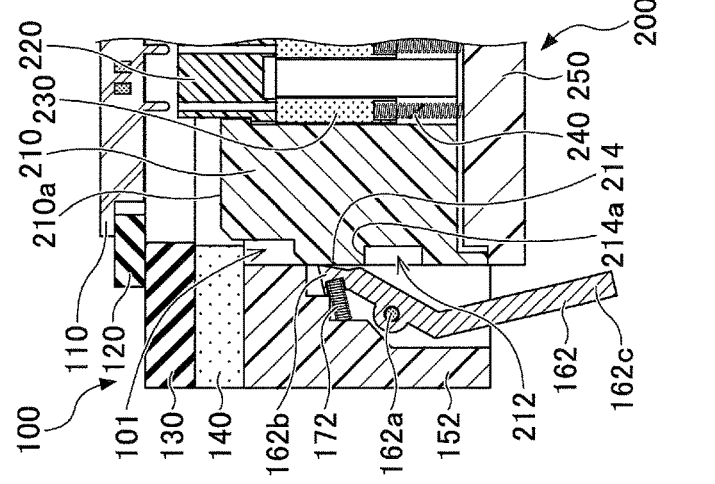
Figure 8C:
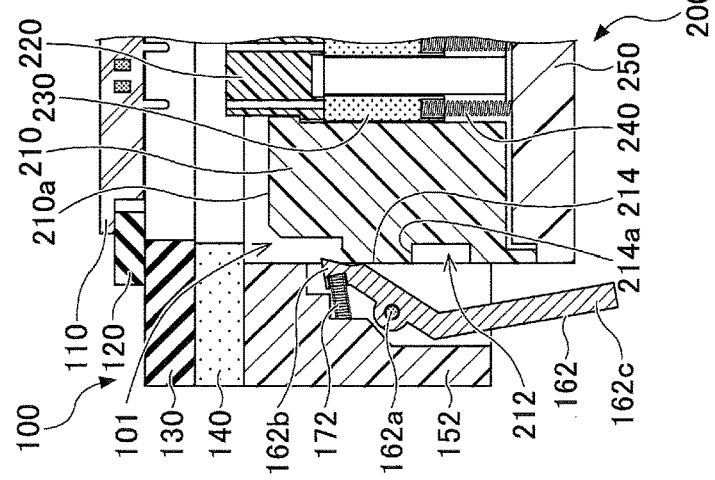

Next, a connection and a disconnection of the jack 100 and the plug 200 are described. As illustrated in FIGS. 8A through 8C, when connecting the jack 100 and the plug 200, the top end 210a of the housing 210 through which the ferrule 220 is exposed is placed into the opening 101 of the jack 100. For convenience of description, the following description is given of the side of the jack 100 on which side the second ejection member 162 is provided. Operations are the same on the side of the jack 100 on which the first ejection member 161 is provided.

First, as illustrated in FIG. 8A, when the top end 210a is placed into the opening 101, the lock 162b is pressed by the projection 214 to pivot the second ejection member 162 counterclockwise about the shaft 162a.

As illustrated in FIG. 8B, when the plug 200 is inserted further into the opening 101, the plug 200 moves further into the opening 101 while pressing the lock 162b with the projection 214.

As illustrated in FIG. 8C, when the plug 200 is inserted even further into the opening 101, the projection 214 moves deeper into the opening 101 beyond the lock 162b, and the second ejection member 162 pivots clockwise about the shaft 162a because of the urging force of the coil spring 172 to cause the lock 162b enter the recess 212. In this state, an end 214a of the projection 214 on the lock 162b side is caught by the lock 162b to be locked. Therefore, the mating of the jack 100 and the plug 200 is maintained.

Next, a disconnection of the plug 200 from the jack 100 is described with reference to FIGS. 9A through 9C.

When disconnecting the plug 200 from the jack 100, as illustrated in FIG. 9A, a force is applied in the direction A, namely, in the direction to bring the operation part 161c and the operation part 162c closer to each other.

As a result, as illustrated in FIG. 9B, the second ejection member 162 pivots counterclockwise about the shaft 162a to bring the lock 162b out of the recess 212. Therefore, the lock 162b is disengaged from the end 214a of the projection 214.

In the state of FIG. 9C, the plug 200 can be pulled out of and disconnected from the jack 100.

[Method of Assembling Optical Connector]

Next, a method of assembling an optical connector according to this embodiment is described.

Figure 10:
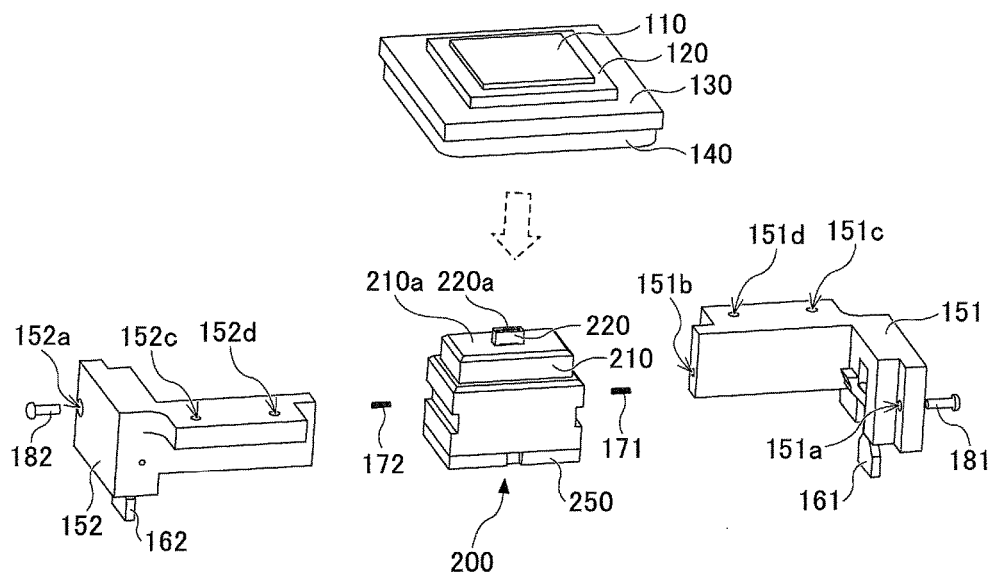
FIG. 10 is a diagram depicting a process of a method of assembling an optical connector according to the first embodiment.

The plug 200 depicted in FIG. 10 is manufactured by placing the ferrule 220, the pistons 230, and the coil springs 240 in the opening 215 of the housing 210, and closing the opening 215 by the lid 250. Then, the optical fiber 260 is connected to the ferrule 220.

Figure 11:
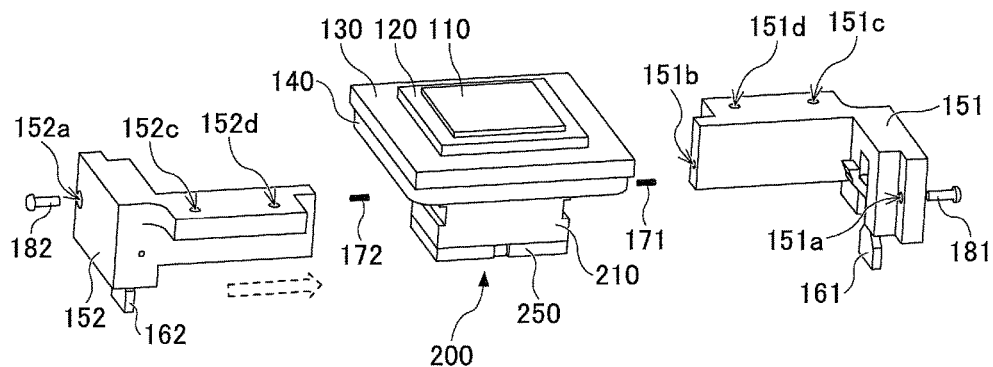
FIG. 11 is a diagram depicting the process of the method of assembling an optical connector according to the first embodiment.

Next, as illustrated in FIG. 11, the plate 140 on which the substrate 130, the LGA socket 120, and the optical module 110 are stacked is aligned with the plug 200. For the alignment, the protrusions 113 as depicted in FIG. 3B are inserted into the through holes 221 as depicted in FIG. 4B.

Figure 12:
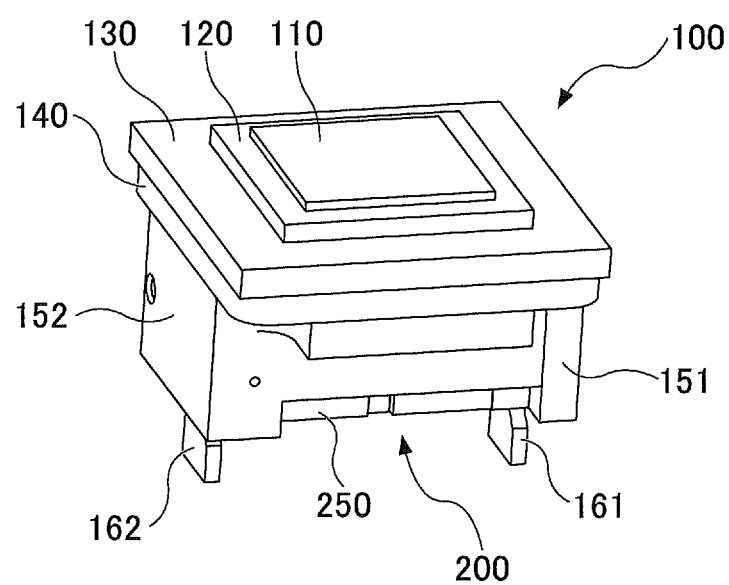
FIG. 12 is a diagram depicting the process of the method of assembling an optical connector according to the first embodiment.

Next, as illustrated in FIG. 12, the first adapter 151 to which the first ejection member 161 is attached and the second adapter 152 to which the second ejection member 162 is attached are connected around the plug 200 in the aligned state. Furthermore, the first adapter 151 and the second adapter 152 are attached to the plate 140.

Figure 13A:
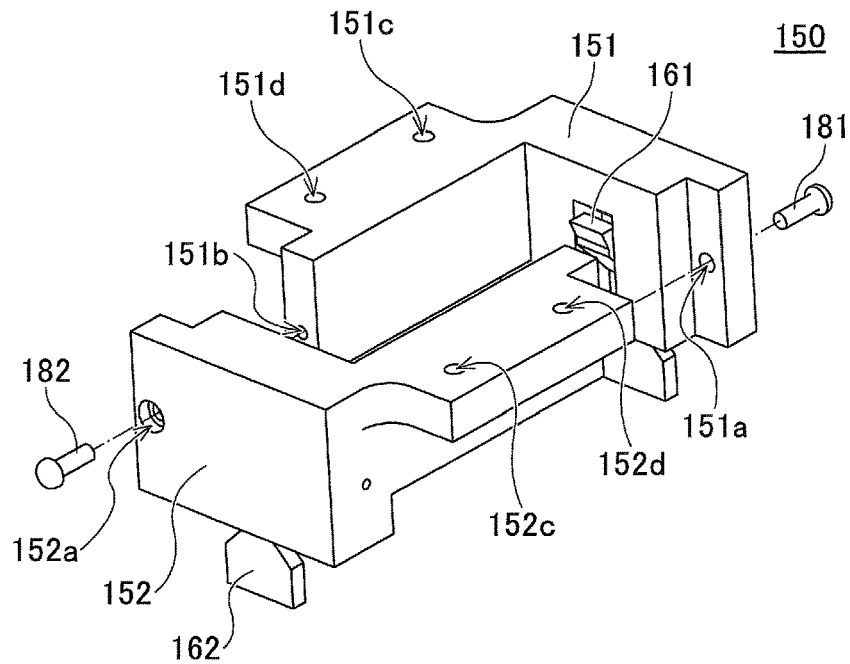
FIGS. 13A and 13B are diagrams illustrating the method of assembling an optical connector according to the first embodiment.
Figure 13B:
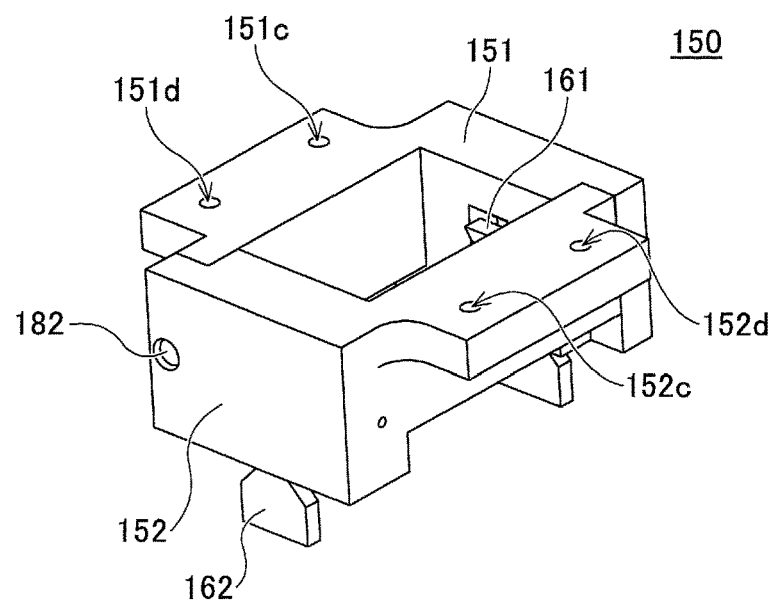

FIG. 13A is a diagram depicting the first adapter 151 and the second adapter 152 before being connected. FIG. 13B is a diagram depicting the first adapter 151 and the second adapter 152 that are connected. As depicted in FIG. 13A, the screw hole 151a and a screw hole of the second adapter 152 corresponding to the screw hole 151a are screwed together with the screw 181, and the screw hole 152a and the screw hole 151b are screwed together with the screw 182. As a result, as depicted in FIG. 13B, the first adapter 151 and the second adapter 152 are connected to form the adapter 150.

Figure 14A:
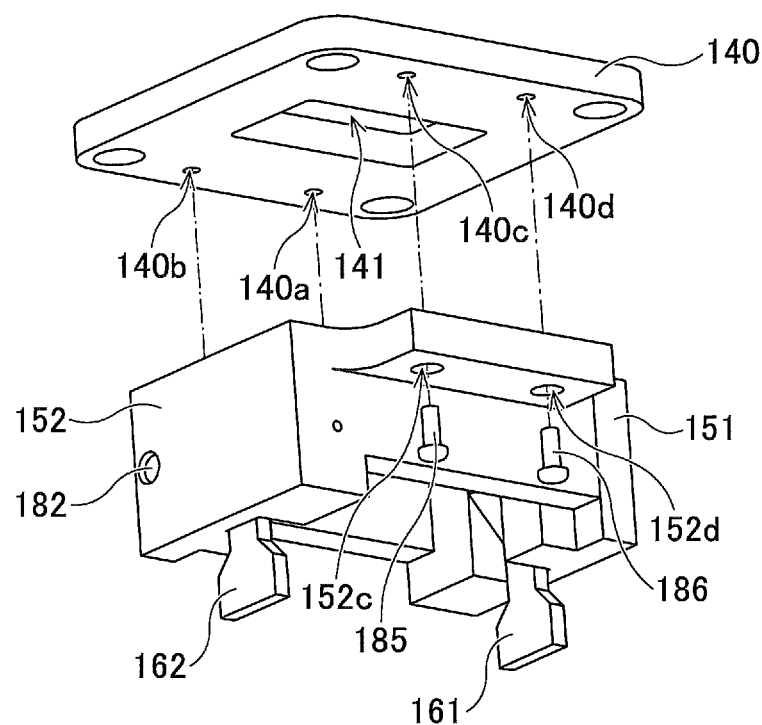
FIGS. 14A and 14B are diagrams illustrating the method of assembling an optical connector according to the first embodiment.
Figure 14B:
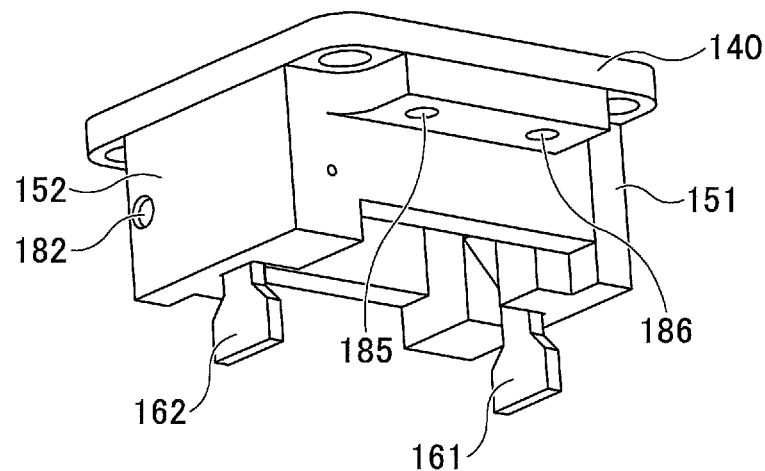

FIG. 14A is a schematic diagram depicting the adapter 150 and the plate 140 before being connected. FIG. 14B is a schematic diagram depicting the adapter 150 and the plate 140 that are connected. Referring to FIG. 14A as well as FIGS. 2, 13A and 13B, the screw hole 151c and a screw hole 140a of the plate 140 are screwed together with the screw 183, and the screw hole 151d and a screw, hole 140b of the plate 140 are screwed together with the screw 184. Likewise, the screw hole 152c and a screw hole 140c of the plate 140 are screwed together with the screw 185, and the screw hole 152d and a screw hole 140d of the plate 140 are screwed together with the screw 186. As a result, as depicted in FIG. 14B, the adapter 150 is connected to the plate 140.

Figure 15:
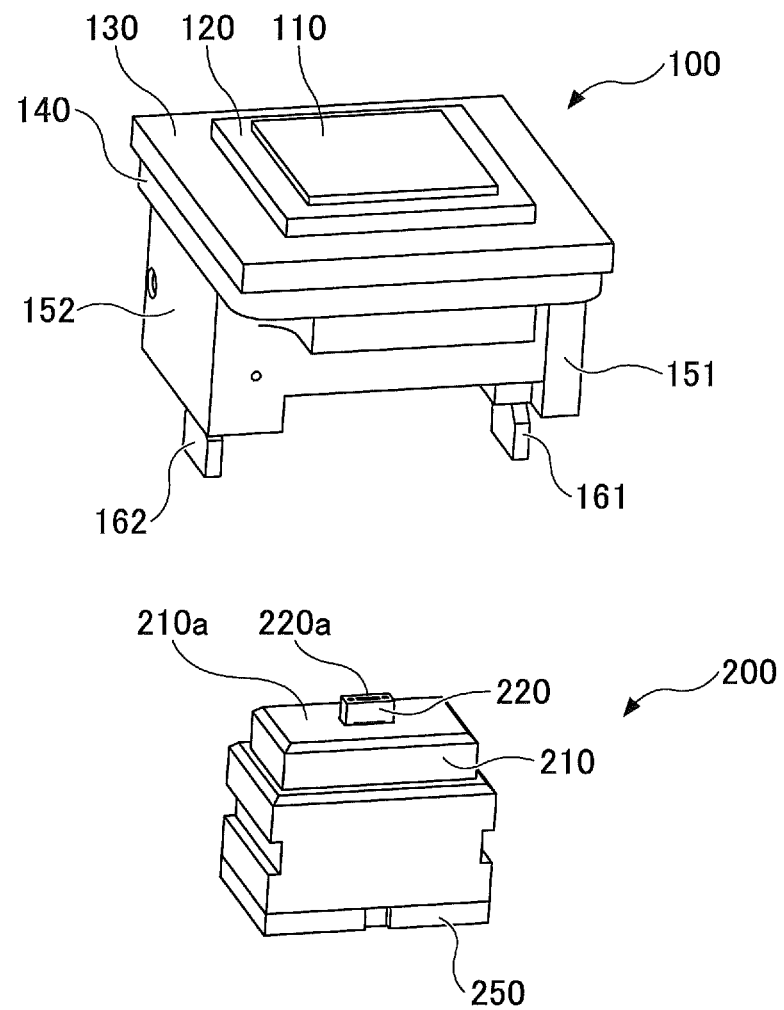
FIG. 15 is a diagram depicting the process of the method of assembling an optical connector according to the first embodiment.

By the above-described assembling process, the jack 100 and the plug 200 according to this embodiment are assembled as depicted in FIG. 15.

The jack 100 and the plug 200 assembled by the above-described assembling process are so formed as to be connected at a desired position when the jack 100 and the plug 200 are mated together.

Second Embodiment

Next, an optical connector according to a second embodiment is described. According to this embodiment, an optical fiber cover 470 is attached to the plug 200.

Figure 16:
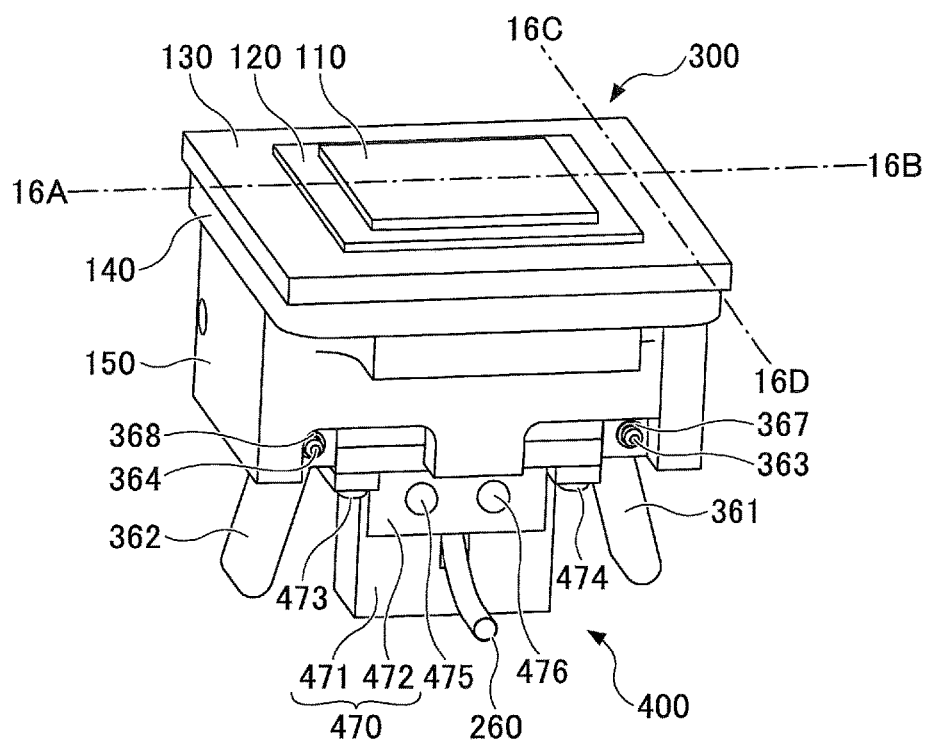
FIG. 16 is a perspective view of an optical connector according to a second embodiment.
Figure 17:
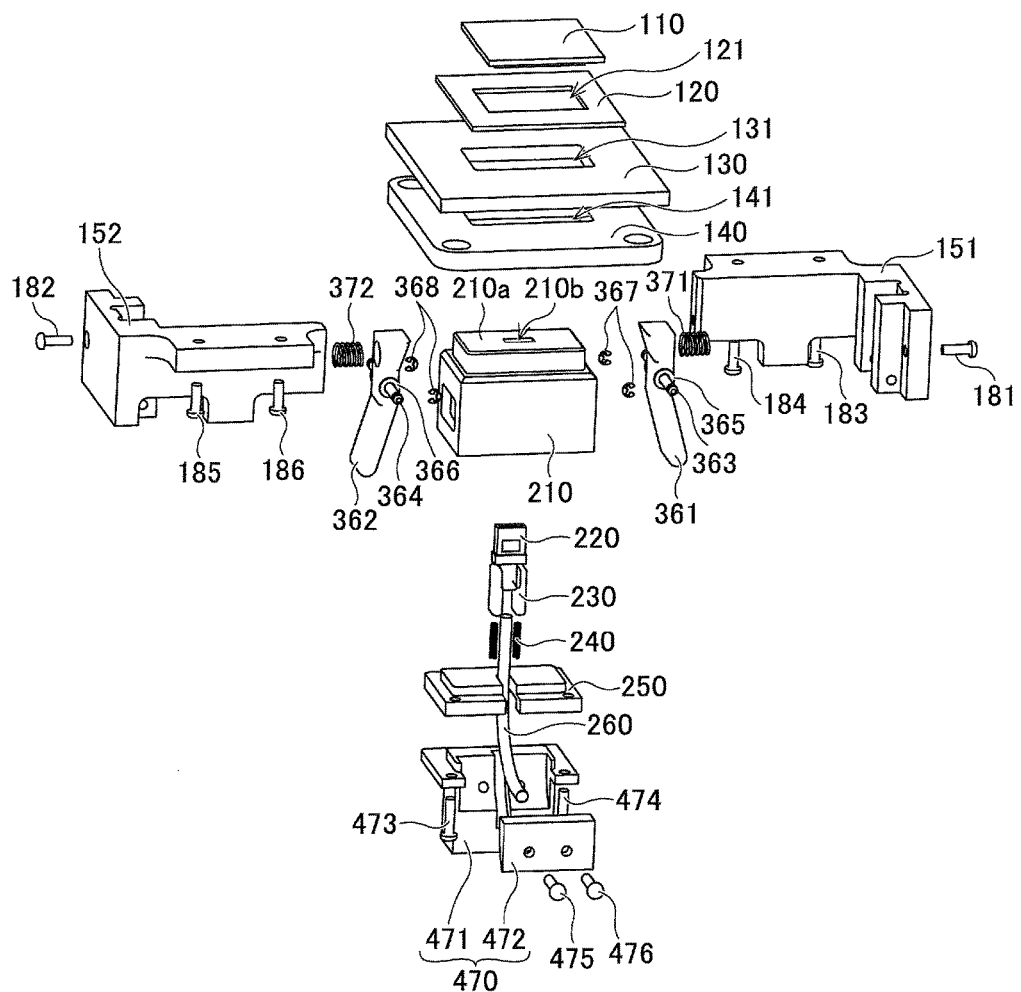
FIG. 17 is an exploded perspective view of the optical connector according to the second embodiment.
Figure 18:
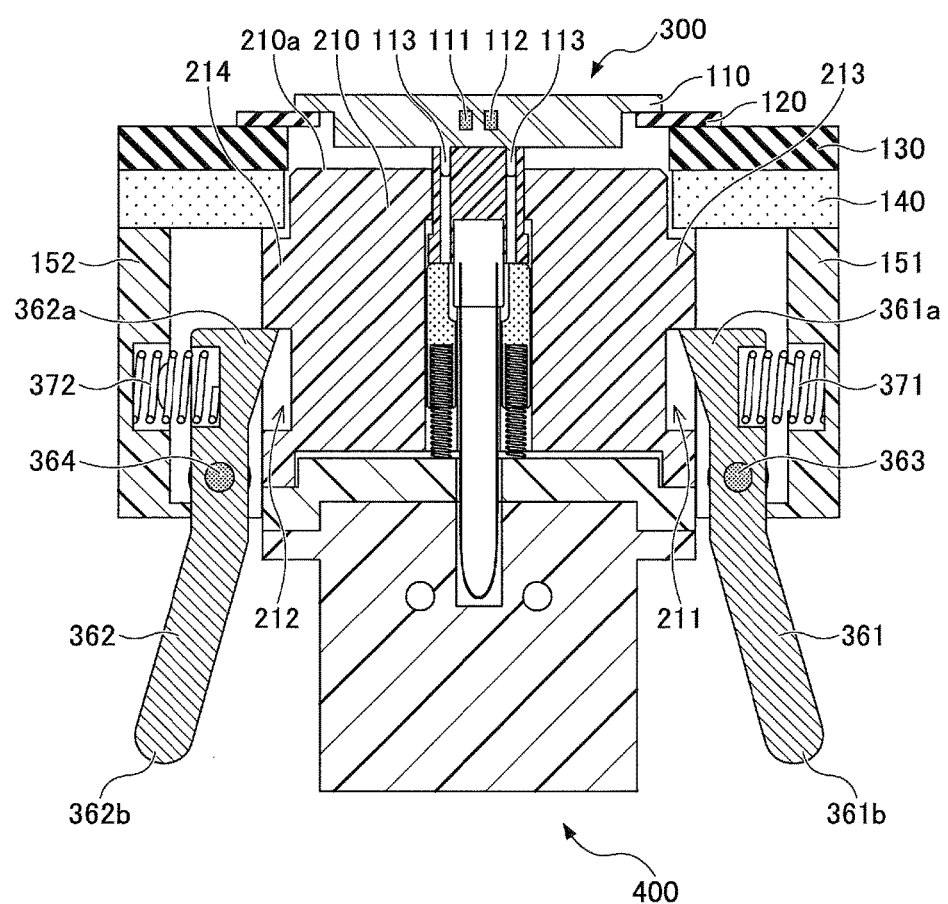
FIG. 18 is a cross-sectional view of the optical connector according to the second embodiment.
Figure 19:
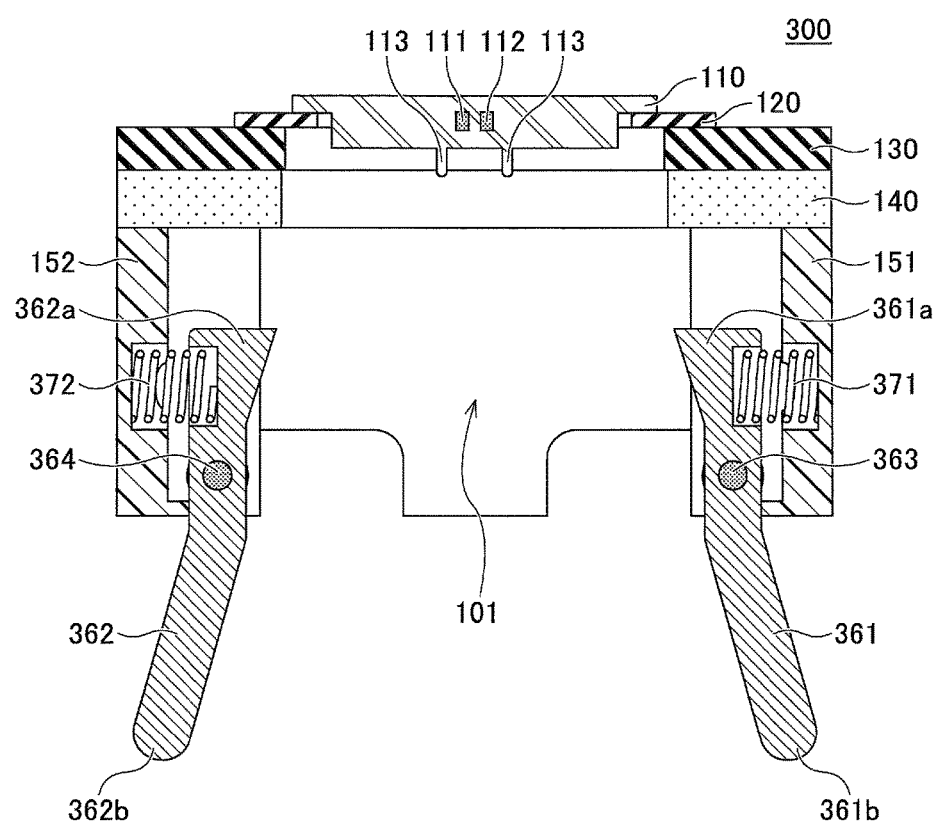
FIG. 19 is a cross-sectional view of an optical connector jack according to the second embodiment.
Figure 20:
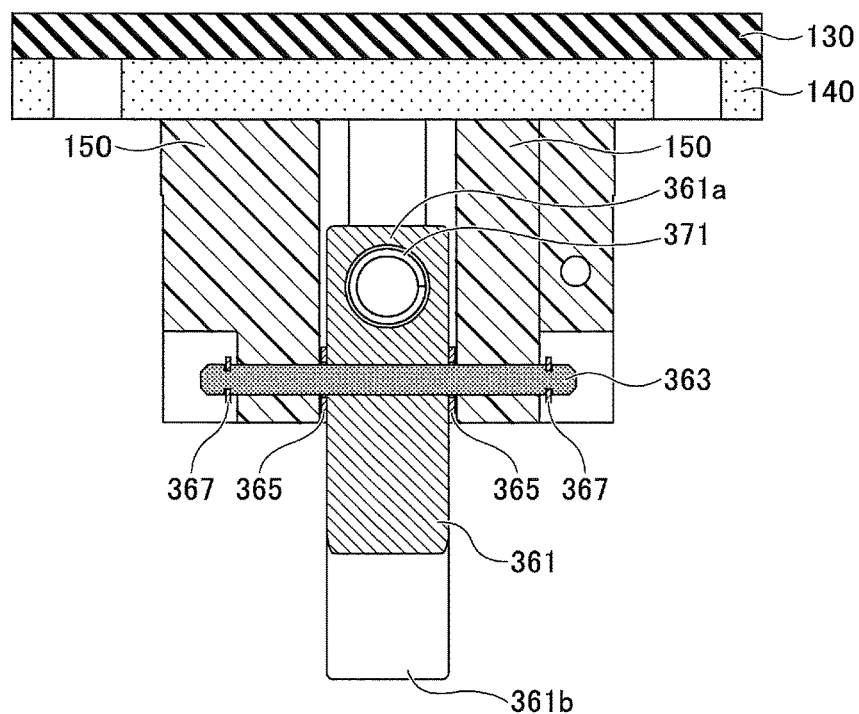
FIG. 20 is a cross-sectional view of the optical connector according to the second embodiment.

FIGS. 16 and 17 are a perspective view and an exploded perspective view, respectively, of an optical connector according to this embodiment. FIG. 18 is a cross-sectional view of an optical connector jack (hereinafter "jack") 300 and an optical connector plug (hereinafter "plug") 400 that are mated together, taken along the one-dot chain line 16A-16B of FIG. 16. FIGS. 19 and 20 are cross-sectional views of the jack 300, taken along the one-dot chain line 16A-16B and the one-dot chain line 16C-16D, respectively, of FIG. 16.

[Ejection Member]

According to this embodiment, a first ejection member 361 is attached to the first adapter 151, and a second ejection member 362 is attached to the second adapter 152.

The first ejection member 361 is attached to the first adapter 151 on its opening 101 side to be pivotable about a shaft 363 formed of an elongated columnar pin. The first ejection member 361 includes a lock 361a positioned closer to the bottom of the opening 101 than is the shaft 363, and an operation part 361b projecting outward from the opening 101. A coil spring 371 is provided between the first adapter 151 and the lock 361a.

The second ejection member 362 is attached to the second adapter 152 on its opening 101 side to be pivotable about a shaft 364 formed of an elongated columnar pin. The second ejection member 362 includes a lock 362a positioned closer to the bottom of the opening 101 than is the shaft 364, and an operation part 362b projecting outward from the opening 101. A coil spring 372 is provided between the second adapter 152 and the lock 362a.

The coil springs 371 and 372 urge the locks 361a and 362a toward each other.

Figure 21A:
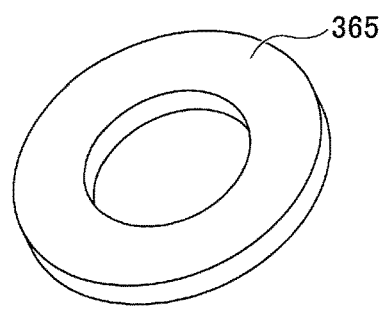
FIG. 21A is a perspective view of a washer.
Figure 21B:
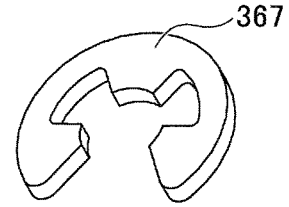
FIG. 21B is a perspective view of an E-ring.

According to this embodiment, as depicted in FIG. 20, the shaft 363 pierces through the first ejection member 361, and washers 365 are provided on the shaft 363 between the first ejection member 361 and the adapter 150, one on each side of the first ejection member 361. Furthermore, E-rings 367 are provided one each on both ends of the shaft 363. For example, a plain washer 365 as depicted in FIG. 21A can be used, and an E-ring 367 as depicted in FIG. 21B can be used. By providing the washers 365 on the shaft 363 between the adapter 150 and the first ejection member 361, the adapter 150 and the first ejection member 361 are prevented from directly contacting each other. Therefore, the first ejection member 361 can smoothly pivot. The E-rings 367 prevent the shaft 363 from being pulled out of the adapter 150.

Likewise, the shaft 364 pierces through the second ejection member 362, and as depicted in FIG. 17, washers 366 are provided on the shaft 364 between the second ejection member 362 and the adapter 150, one on each side of the second ejection member 362. Furthermore, E-rings 368 are provided one each on both ends of the shaft 364.

To attach the E-rings 367 and 368 to the shafts 363 and 364, the adapter 150 is cut to form a space where the E-rings 367 and 368 are attached to the shafts 363 and 364. This arrangement can prevent the end portions of the shafts 363 and 364 or the E-rings 367 and 368 from projecting outward from the adapter 150.

Furthermore, the recess 211 corresponding to the lock 361a and the recess 212 corresponding to the lock 362a are formed one on each side of the housing 210. The projection 213 is positioned between the top end 210a and the recess 211 and the projection 214 is positioned between the top end 210a and the recess 212.

When the jack 300 and the plug 400 are mated together, the lock 361a is in the recess 211 and the lock 362a is in the recess 212. This arrangement can prevent the jack 300 and the plug 400 mated together from disengaging from each other.

[Optical Fiber Guide]

Figure 22:
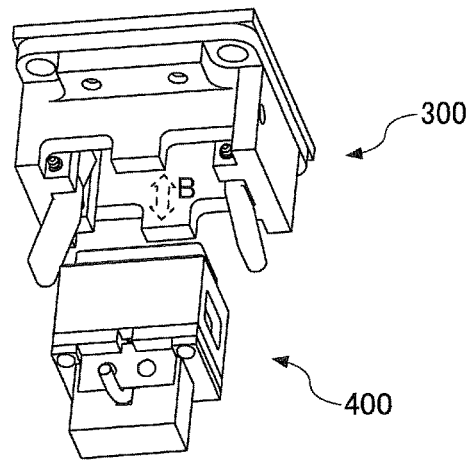
FIG. 22 is a diagram illustrating a method of connecting the optical connector jack and an optical connector plug according to the second embodiment.
Figure 23:
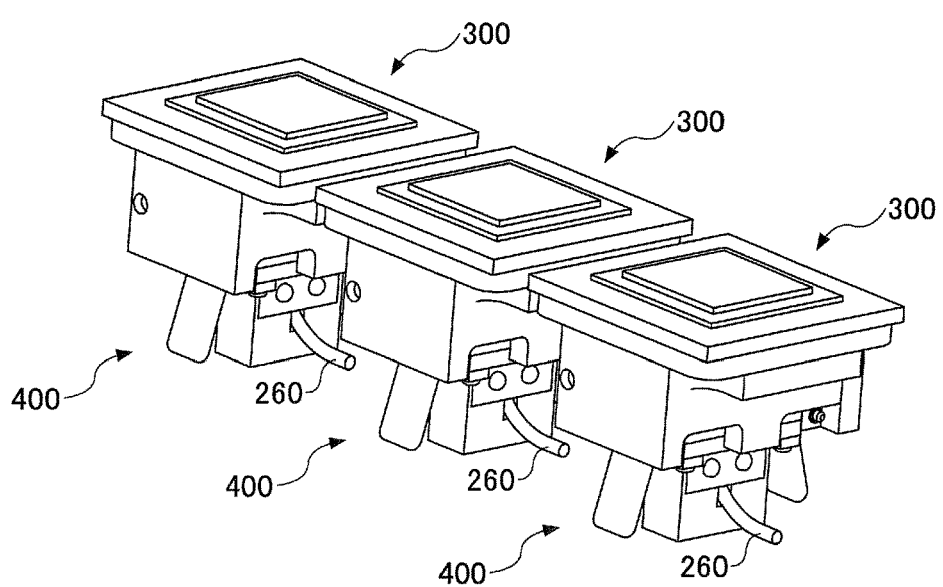
FIG. 23 is a diagram illustrating the case where multiple optical connectors according to the second embodiment are provided.

According to the optical module of this embodiment, the jack 300 can be connected or disconnected by vertically moving the jack 300 in a direction B in FIG. 22. When multiple optical modules are used in an array, the optical modules are arranged side by side as depicted in FIG. 23 with an open space above the optical modules. The optical fibers 260 connected to the optical modules extend in a direction in which the optical modules are arranged, and are bent substantially at a right angle where the optical fibers 260 connect to the plugs 400. When the optical fiber 260 is bent substantially at a right angle, a strong force is applied to the bent portion and the optical fiber 260 may be damaged. Furthermore, when the optical fiber 260 is bent with a radius of curvature smaller than the minimum bend radius of the optical fiber 260, light propagating through the optical fiber 260 leaks out to cause optical loss.

Figure 24A:
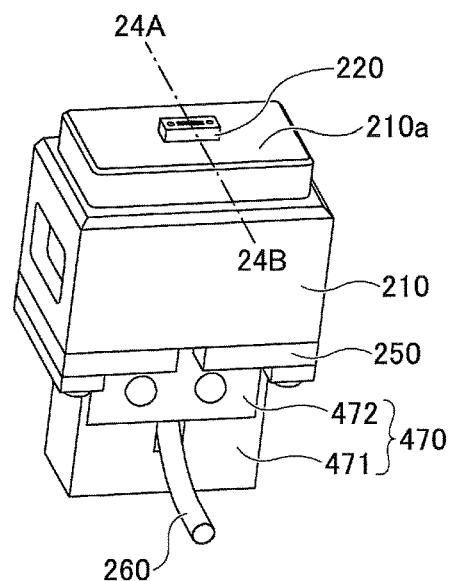
FIGS. 24A and 24B are diagrams illustrating the optical connector plug according to the second embodiment.
Figure 24B:
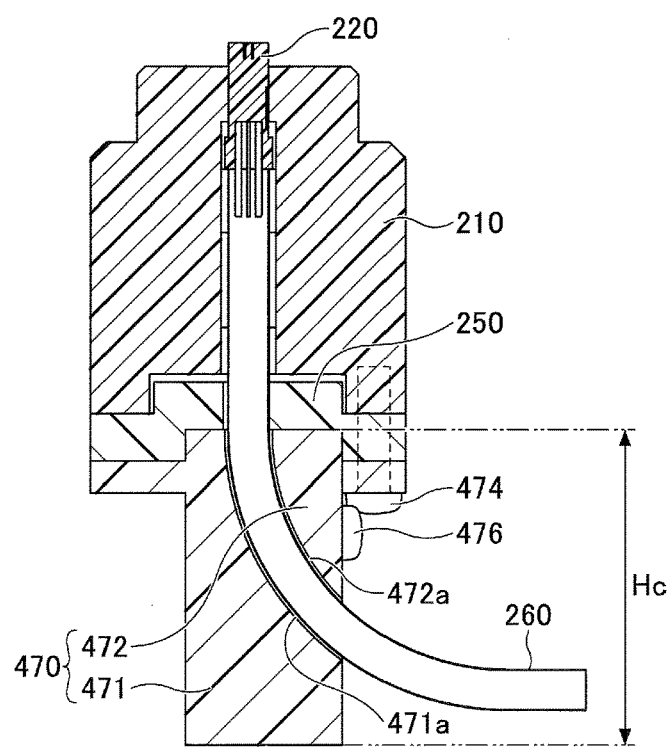

Therefore, according to this embodiment, as illustrated in FIGS. 24A and 24B, the optical fiber cover 470 is provided to protect the optical fiber 260 that is bent at the connection with the plug 400. The optical fiber cover includes a lower cover 471 and an upper cover 472. According to this embodiment, the optical fiber cover 470 is divided into the lower cover 471 and the upper cover 472 to first attach the optical fiber 260 to the plug 400 and then attach the optical fiber cover 470. FIG. 24A is a perspective view of the plug 400. FIG. 24B is a cross-sectional view of the plug 400, taken along the one-dot chain line 24A-24B of FIG. 24A. The upper cover 472 may be referred to as "first cover" and the lower cover 471 may be referred to as "second cover."

According to this embodiment, the upper cover 472 includes a curved surface 472a having a radius of curvature greater than the minimum bend radius of the optical fiber 260. The lower cover 471 includes a curved surface 471a having a shape corresponding to the shape of the curved surface 472a. The optical fiber cover 470 has a height Hc that is greater than the minimum bend radius of the optical fiber 260. According to this embodiment, the optical fiber 260 has a diameter of approximately 3 mm and a minimum bend radius of approximately 15 mm, and the height Hc of the optical fiber cover 470 is more than or equal to 20 mm.

The lower cover 471 is attached to the lid 250 with screws 473 and 474. The upper cover 472 is attached to the lower cover 471 with screws 475 and 476 with the optical fiber 260 being inserted between the curved surface 471a and the curved surface 472a.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An optical connector, comprising:
    a first connector; and
    a second connector configured to be mated to the first connector, wherein
    the first connector includes
        a plate having a first opening;
        a substrate stacked on the plate, the substrate having a second opening; and
        an adapter having a third opening and connected to the plate, and
    the second connector includes
        a housing; and
        a ferrule configured to connect to an optical fiber and provided in the housing to project from the housing to have an end of the ferrule exposed outside the housing, the ferrule being inserted in the first opening, the second opening, and the third opening when the first connector and the second connector are mated together.

2. The optical connector as claimed in claim 1, wherein the second connector further comprises a first spring and a second spring that urge the ferrule toward the housing, the first spring and the second spring being on opposite sides of the optical fiber when the ferrule connects to the optical fiber.

3. The optical connector as claimed in claim 2, wherein the second connector further comprises a first piston disposed between the ferrule and the first spring to press the ferrule and a second piston disposed between the ferrule and the second spring to press the ferrule.

4. The optical connector as claimed in claim 1, wherein the housing includes a first housing and a second housing attached to the first housing, the first housing including a curved surface and a second housing including a projection facing the curved surface, and the optical fiber is to be held between the curved surface and the projection.

5. The optical connector as claimed in claim 1, further comprising:
    an ejection member pivotably provided on the adapter, the ejection member including a lock configured to engage with a recess formed on the housing, and an operation part extending from the lock; and
    a spring that urges the lock toward the recess,
    wherein the lock is disengaged from the recess when the operation part is operated to pivot the ejection member.

6. The optical connector as claimed in claim 5, wherein the ejection member contacts an inner surface of the adaptor by an urging force of the spring.

7. The optical connector as claimed in claim 1, further comprising:
    an optical fiber cover configured to surround and cover the optical fiber,
    the optical fiber cover including
        a first cover including a curved surface having a radius of curvature greater than a minimum bend radius of the optical fiber, the curved surface being configured to contact the optical fiber; and
        a second cover combined with the first cover,
    wherein an inner surface of the second cover faces the curved surface.

8. A connector configured to connect to another connector including an optical fiber, the connector comprising:
    a housing including a first housing and a second housing combined with the first housing, wherein an opening into which said another connector is to be inserted is formed between the combined first housing and second housing; and
    an optical module disposed over the opening,
    the optical module including
        a plate disposed over the opening; and
        a substrate stacked on the plate.

9. A connector configured to connect to another connector, the connector comprising:
    a housing;
    a ferrule provided in the housing, the ferrule being configured to connect to an optical fiber; and
    a cover configured to cover the optical fiber when the ferrule connects to the optical fiber,
    the cover including a first cover and a second cover that are combined with each other,
    wherein each of the first cover and the second cover includes a curved surface on a side to face the optical fiber, the curved surface having a radius of curvature greater than a minimum bend radius of the optical fiber.

* * * * *